United States Patent
Tang et al.

(10) Patent No.: US 6,765,577 B1
(45) Date of Patent: Jul. 20, 2004

(54) APPARATUS AND METHOD FOR ROTATING ON-SCREEN DISPLAY FONTS

(75) Inventors: Ping-Fa Tang, Hsinchu (TW); Chi-Tien Chen, Taoyuan (TW)

(73) Assignee: Myson Technology Inc., Hsinchu (TW)

(*) Notice: Subject to any disclaimer, the term of this patent is extended or adjusted under 35 U.S.C. 154(b) by 442 days.

(21) Appl. No.: 09/708,457

(22) Filed: Nov. 9, 2000

(30) Foreign Application Priority Data

Aug. 29, 2000 (TW) .......................... 89117521 A

(51) Int. Cl.⁷ .............................................. G06T 11/00
(52) U.S. Cl. ...................................... 345/471; 382/289
(58) Field of Search ............................... 345/471, 472, 345/473–473.3, 649, 657, 658–659; 382/182–184, 289, 290, 291, 292–301; 358/1.11; 101/7, 93.21

(56) References Cited

U.S. PATENT DOCUMENTS

| | | | | |
|---|---|---|---|---|
| 4,903,014 A | * | 2/1990 | Yoshida ...................... | 345/471 |
| 4,992,959 A | * | 2/1991 | Hamada et al. ............. | 358/1.11 |
| 4,995,089 A | * | 2/1991 | Altrieth, III ................ | 382/297 |
| 5,409,318 A | * | 4/1995 | Imamiya ...................... | 400/76 |
| 6,081,300 A | * | 6/2000 | Beyers, Jr. et al. ......... | 348/589 |
| 6,339,426 B1 | * | 1/2002 | Lui et al. .................... | 345/467 |

* cited by examiner

Primary Examiner—Michael Razavi
Assistant Examiner—Thu-Thao Havan
(74) Attorney, Agent, or Firm—Sughrue Mion, PLLC

(57) ABSTRACT

An apparatus and method for rotating OSD fonts are disclosed. The OSD rotation device including a central processing unit, font addresses generator, memory, a font ROM, a decoder, a shift register, a output controller and output circuits, a synchronization signal generator, and a display device. In a manner, the OSD fonts corresponding to the OSD font addresses are produced. Next, the OSD fonts is read and delivered to the decoder. Further, the decoder performs a decoding process for the OSD fonts to form a plurality of rotated fonts. The OSD message, including the rotated fonts, is displayed on a display device so that the video display is synchronized with the OSD message.

26 Claims, 7 Drawing Sheets

APPARATUS AND METHOD FOR ROTATING ON-SCREEN DISPLAY FONTS

FIELD OF THE INVENTION

The present invention relates to an apparatus and method for rotating fonts, and more particularly, to an apparatus and method for rotating on-screen display (OSD) fonts.

BACKGROUND OF THE INVENTION

With the rapid popularization of computer related to peripheral fields these years, many display devices, e.g. cathode ray tube (CRT) display and liquid crystal display (LCD), have been increasingly playing an important role in these fields. The performance of these display devices essentially depends on the calibration of parameters beside the optimal parameters of manufacturers, e.g. contrast, brightness, vertical and horizontal sizes, and geometric shapes etc. The on-screen display (OSD) provides users with interactive information to obtain a best display quality through the above parameters. There is a selection button for an OSD message display mode. An OSD device will receive a demand signal and be sent to central processing unit (CPU) in the OSD device to control precisely the contrast, brightness, vertical and horizontal sizes when users push the selection button inducing the demand signal. Further, the users can clearly observe the effect due to the adjustment of the parameters. Additionally, a video display is overlapped over the OSD message.

However, the conventional OSD message can't comply with the video display when the display device is rotated, namely, the OSD message is asynchronous with the video display so that the OSD message is set in an improper position where is disadvantageous to users for viewing the parameters within the OSD message. Further, as such, it will contribute to a big deviation and inconvenient condition during adjusting the parameters. Currently, operated in line-scan to form a complete video display, most of the display devices are continuously scanned line by line in accordance with the vertical or horizontal signal of the display device. Therefore, the fonts of the OSD message must be also sequentially output into display devices. Since the vertical or horizontal signal referred to OSD device still remain invariable when the display device is rotated, the OSD message and the display device is asynchronous such that the OSD message is inconsistent with the video display resulting in improper view position for users. In FIG. 1A, after the display device is rotated, the figure shows the relation between the OSD message and the video display.

As a result, as the display device is rotated, the conventional OSD message is not able to be synchronous with the video display. Such a situation severely causes a quite inconvenience and induces a lot of errors when adjusting parameters of the display device. Moreover, the fonts of the conventional OSD message are implemented by the bit-mapped such that the processes of OSD fonts are inefficiency. Such not only consumes a lot of memory but also considerably increases computation time as rotating the OSD fonts.

SUMMARY OF THE INVENTION

In view of the foregoing, the conventional OSD device has been encountered with the problem that the OSD message is asynchronous with the video display.

As a result, the primary object of the present invention is to provide. an apparatus and method for rotating OSD fonts such that the OSD message and the video display remain in readily observable position for users.

Another object of the present invention is to provide an apparatus and method so as to greatly decrease the cost of the font read only memory (ROM) by using a font-based as a reading unit.

According to the above object, the present invention offers an apparatus and method for rotating OSD fonts. The apparatus for rotating the OSD fonts comprises an OSD rotation device including a central processing unit (CPU), font addresses generator, memory, a font ROM, a decoder, a shift register, a output controller and output circuits, a synchronization signal generator, and a display device.

In a manner, an OSD display demand is inputted into a CPU for commanding the CPU to start reading in a plurality of OSD font addresses, and a plurality of OSD fonts corresponding to the OSD font addresses are produced and stored in a memory. Next, the OSD fonts corresponding to the font addresses is read and delivered to the decoder, wherein the OSD fonts are stored initially in the font ROM. Further, the decoder performs a decoding process for the OSD fonts to form a plurality of rotated fonts. The rotated fonts are stored into storage medium and outputted sequentially into the output circuits. The OSD message, including the rotated fonts, is displayed on a display device so that the video display is synchronized with the OSD message.

In the present invention, an apparatus and method for rotating on-screen display fonts is described to remain in the preferred view between the OSD message and the video display. Further, due to the OSD fonts are read in font-based way according the present invention, the operation time of rotating the OSD fonts is much lower than that of the conventional OSD rotated fonts in bit-mapped way. Moreover, the duplicated OSD fonts can be significantly reduced in using the various rotation angles of the OSD fonts.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides an apparatus and method for the rotation of the OSD fonts to improve the drawbacks shown in the above-mentioned.

Figure 1:
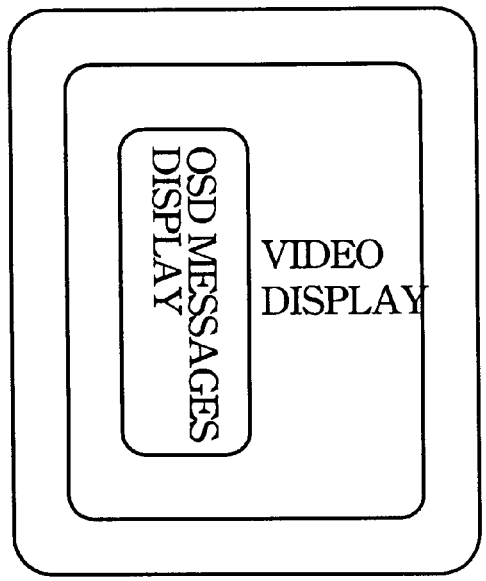
FIG. 1A is a view for showing the relation between the conventional OSD message and the video display after the display device is rotated.
FIG. 1B is a view for showing the relation between the OSD message and the video display after the display device is rotated according to the present invention.
Figure 1:
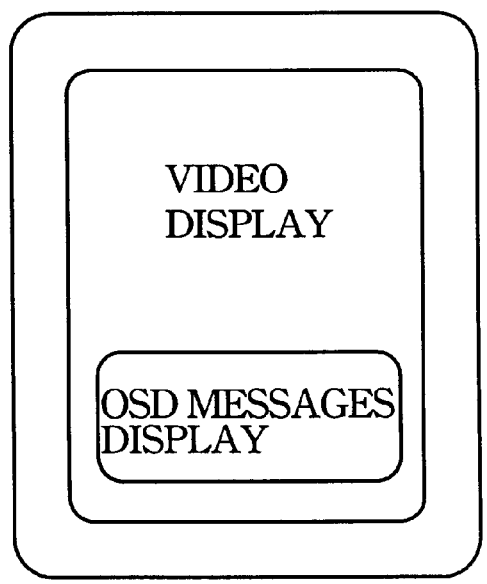

Referring now to FIG. 1B, this figure shows relation between the OSD message and the video display after the display device is rotated. The present invention provides an apparatus and method to form the rotated OSD fonts, generating an OSD message, such that the OSD message is consistent with the video display on display device.

Referring to FIG. 2A~2E, these figures show a fundamental theorem for rotating the OSD fonts. In the preferred embodiment of the present invention, e.g. a character "P", the character is sequentially read in horizontal direction 201 before the OSD fonts are rotated. However, after the OSD fonts are rotated, the character must be read in vertical direction 203, implemented for decoding the OSD fonts by decoder, to output the rotated OSD fonts. More specifically, if the OSD fonts are output according to the character having various patterns, shown in FIG. 2B~2E, the OSD message can always retain consistent with the video display on display device. Additionally, the characters can be replaced with patterns, letters, numbers and special characters.

Figure 2:
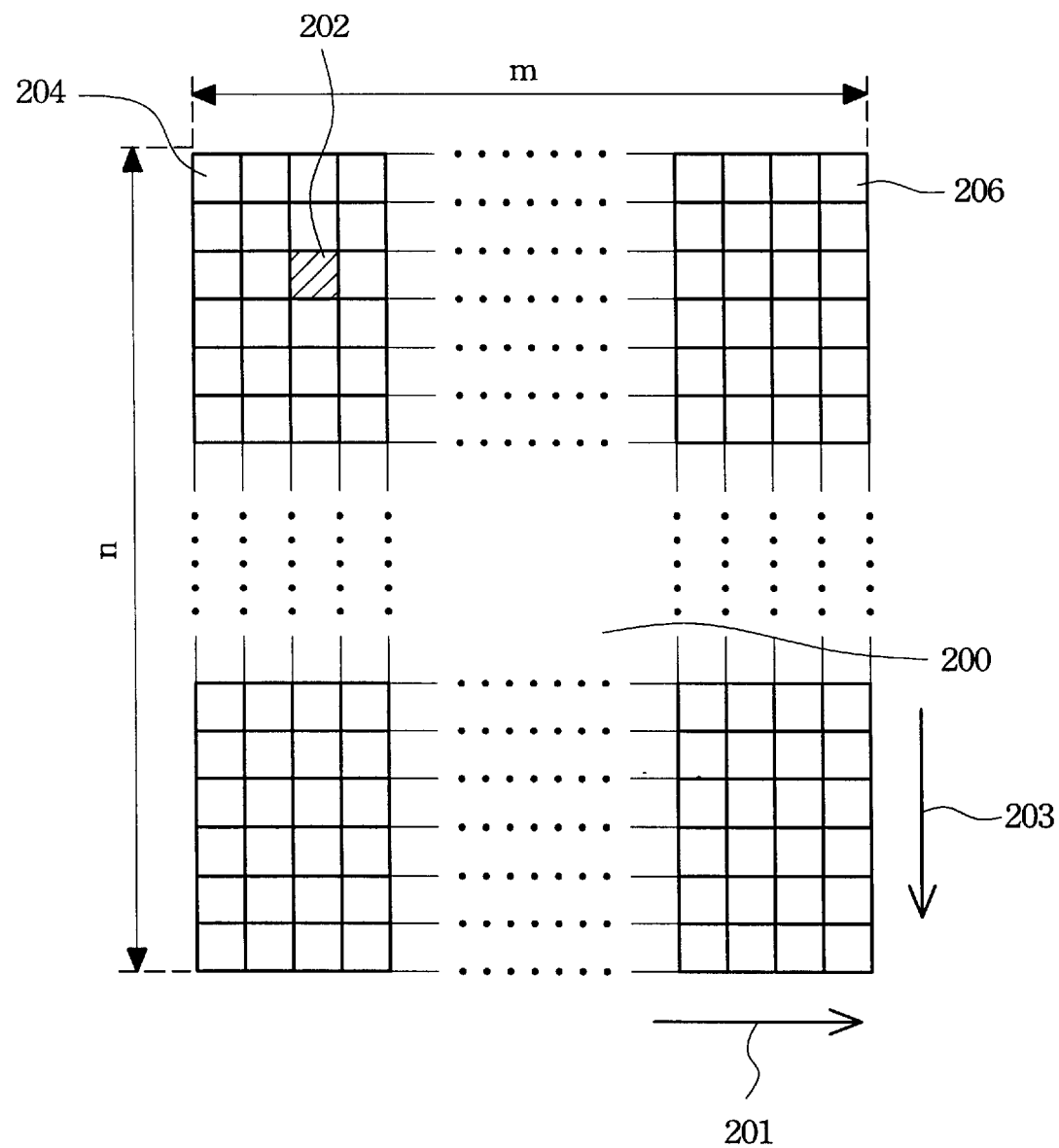
FIGS. 2A~2E illustrates a fundamental theorem for rotating the OSD fonts according to the present invention.
Figure 2:
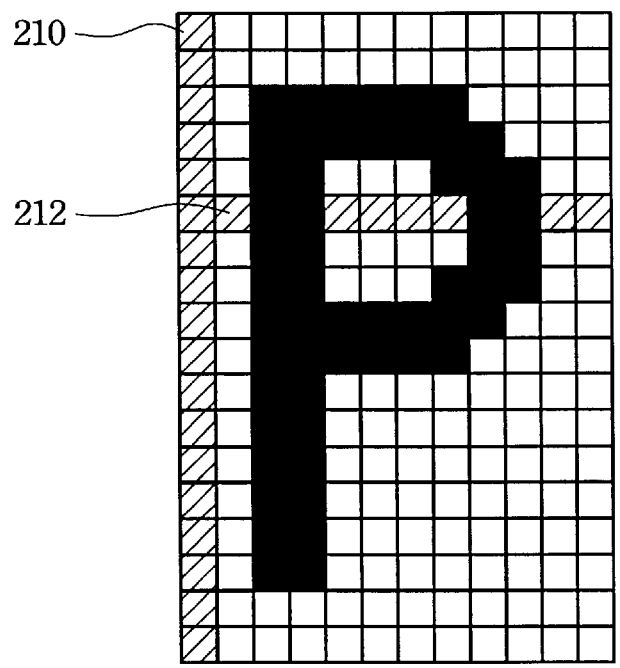
Figure 2:
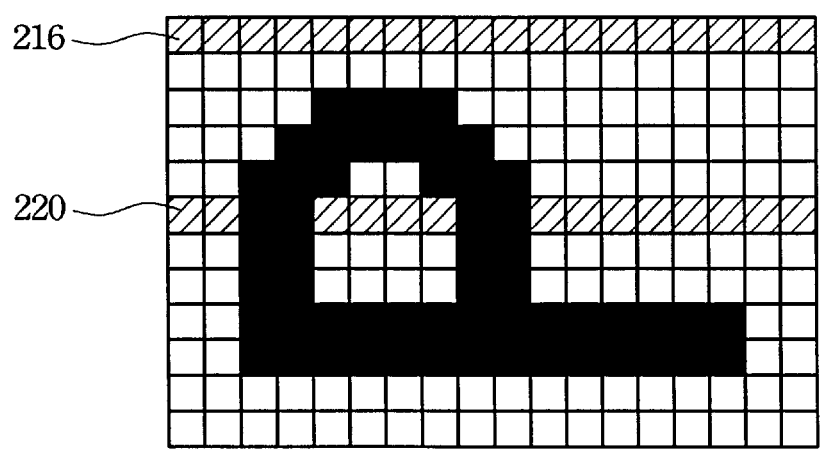
Figure 2:
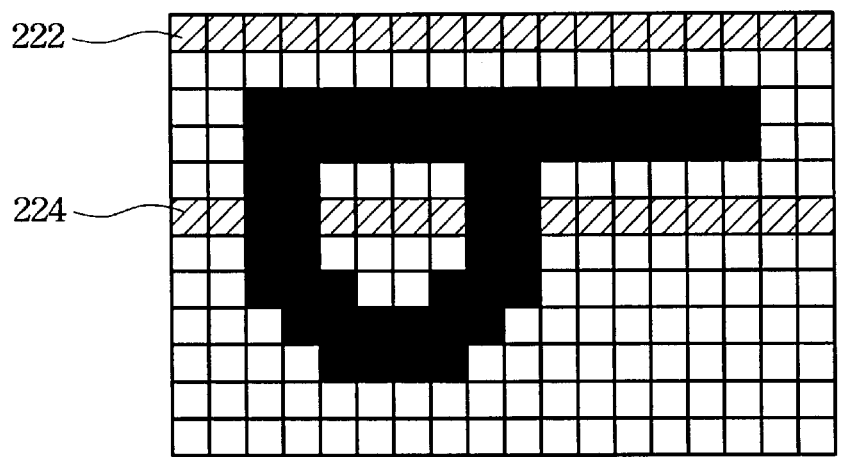
Figure 2:
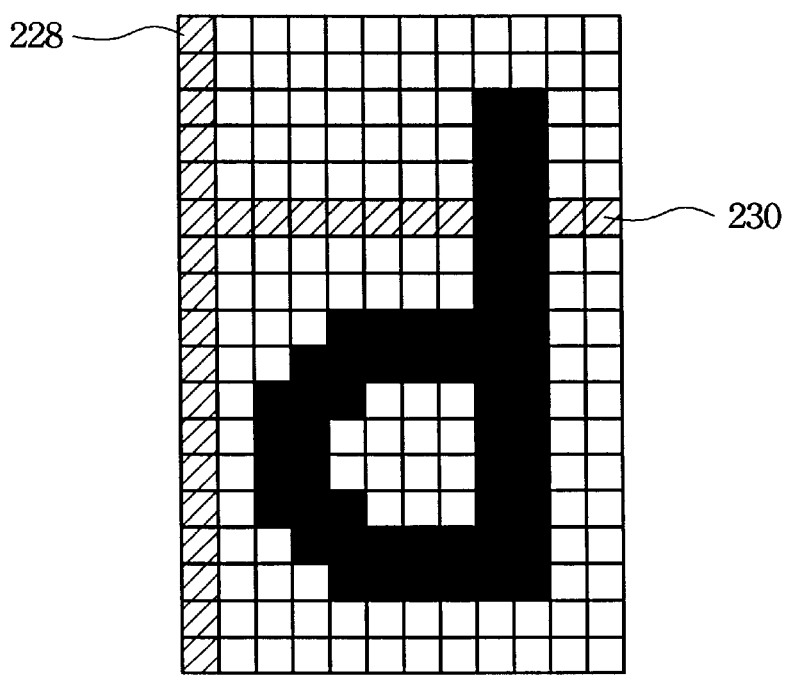

Referring to FIG. 2A, the figure shows a dot matrix of an OSD font. In the preferred embodiment of the present invention, the OSD font is stored in the dot matrix 200 type among memory. In other words, the OSD fonts includes a plurality of dots stored in font ROM by line, and the primary feature reading the OSD font is named as a "font-base" which is directed to an OSD font but not to an individual dot 202 of the OSD font at a time.

The OSD font is composed of the dot matrix m×n wherein m and n is positive integer, such as m=12 and n=18 preferably, and thus all dots of the OSD font are 216 dots in total. Additionally, the bit value of the black dot is defined as "1" and the bit value of the white dot is defined as "0", and the left of dot matrix is defined as most significant bit (MSB) 204 and the right of dot matrix is defined as least significant bit (LSB) 206.

Referring to FIG. 2B, the figure shows a first OSD font stored at a font-based within the font ROM. The OSD rotation device read in 18 bits of each column 210 at a time from the left MSB up to the right LSB and the OSD font is read sequentially by 12 times to form a complete OSD font. For an example of character "P", if the sixth row 212 of the character need to be demonstrated, the character is then read 18 bits of one column 210 at a time until the character is read completely, but only the sixth bit of each column 210 is selected. As the character is read by 12 times in turn, the sixth row 212 is completely formed wherein these respective bit values are "001100001 100" from MSB up to LSB.

Referring to FIG. 2C, the figure shows a second OSD font stored at a font-based within the font ROM. The OSD rotation device read 18 bits of each row 216 at a time from upper LSB in left to lower MSB in right and the OSD font is read sequentially by 12 times to form a complete OSD font. For an example of character "P", if the sixth row 218 of the character need to be demonstrated, the character is then read 18 bits of one row 216 at a time until the character is read completely. As the sixth row 218 is read, the sixth row 218 data is completely formed once wherein these respective bit values are "001100001100000000" from left to right in FIG. 2C.

Referring to FIG. 2D, the figure shows a third OSD font stored at a font-based within the font ROM. The OSD rotation device read 18 bits of each row 222 at a time from upper MSB in left to lower LSB in right and the OSD font is read sequentially by 12 times to form a complete OSD font. For an example of character "P", if the sixth row 224 of the character need to be demonstrated, the character is then read 18 bits of one row 222 at a time until the character is read completely. As the sixth row 224 is read, the sixth row 224 data is completely formed once wherein these respective bit values are "000000001100001100" from left to right in FIG. 2D.

Referring to FIG. 2E, the figure shows a fourth OSD font stored at a font-based within the font ROM. The OSD rotation device read 18 bits of each column 228 at a time from the left MSB to the right LSB and the OSD font is read sequentially by 12 times to form a complete OSD font. For an example of character "P", if the sixth row 230 of the character need to be demonstrated, the character is then read 18 bits of one column 228 at a time until the character is read completely, but only the sixth bit of each column 228 is selected. As the character is read by 12 times in turn, the sixth 230 row is completely formed wherein these bit respective values are "000000001100" from MSB to LSB.

Figure 3:
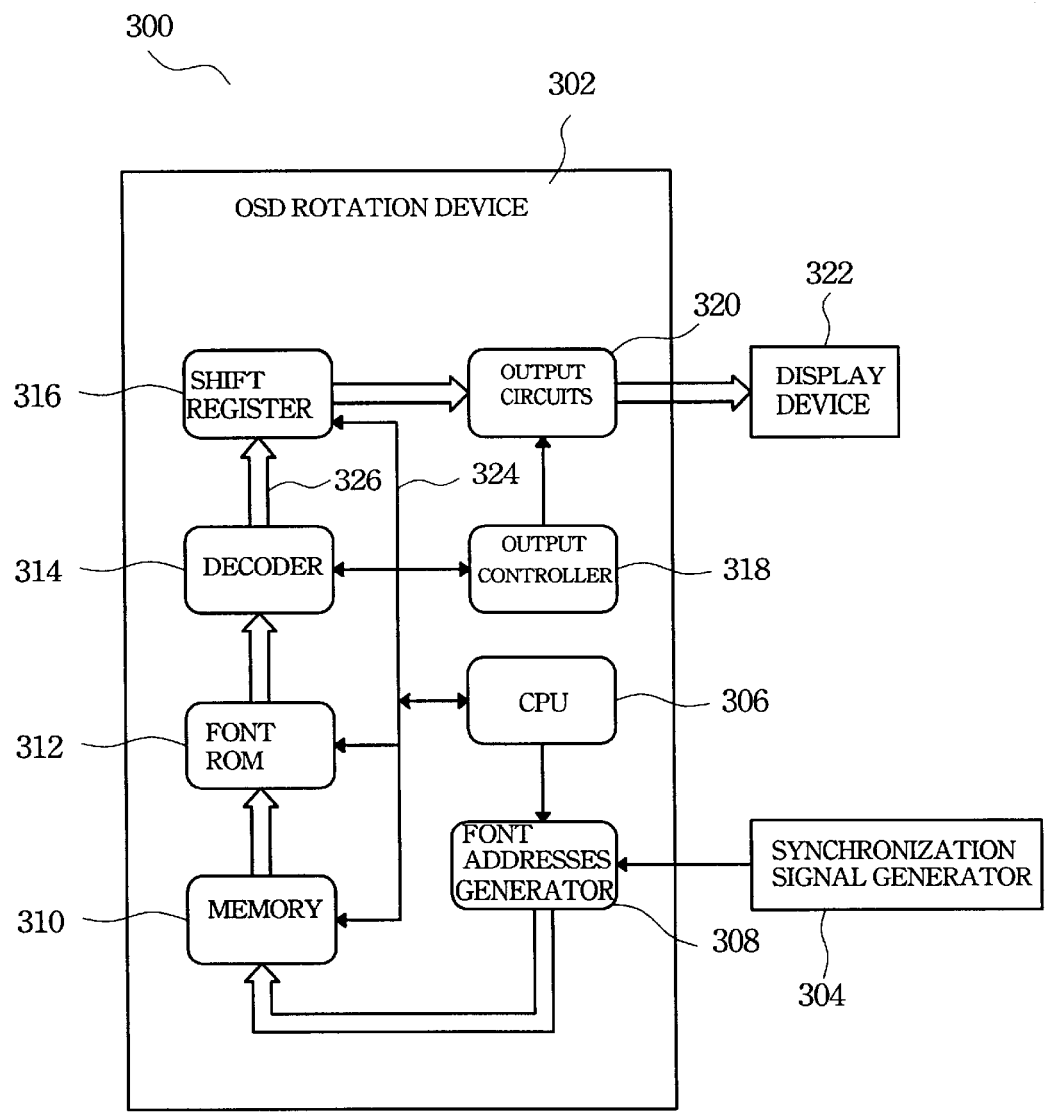
FIG. 3 illustrates a system block diagram for showing the rotation of the OSD fonts according to the present invention.

Referring to FIG. 3, the figure shows a system block diagram 300 for showing the rotation of the OSD fonts. The system block diagram 300 comprises an OSD rotation device 302 including a central processing unit (CPU) 306, font addresses generator 308, memory 310, a font ROM 312, a decoder 314, a shift register 316, a output controller 318 and output circuits 320, a synchronization signal generator 304, and a display device 322.

The synchronization signal generator 304 is a scan frequency generator of the display 322 device and is used as a reference signal for rotation OSD font during scanning so that the OSD message, including the OSD rotation fonts, is consistent with the video display in display direction. The CPU 306, such as micro control unit (MCU) and digital signal processor (DSP), plays an important role for the rotated OSD fonts. The CPU 306 employs various buses (324, 326), e.g. control bus, address bus and data bus, to transmit the signals and OSD fonts to various units within the OSD rotation device for processing.

The font address generator 308 is a address generator device of OSD fonts, which is controlled by the CPU 306, to form the desired OSD fonts and uses the synchronization generator 304 as a reference signal source. The memory 310, such as static access memory (SPAM), is a medium storage device used to store the font addresses of the desired OSD fonts. The font ROM 312 is also a medium storage device used to store the OSD fonts of the OSD message. The shift register 316, storage medium, is used to convert parallel data format into serial data format stored in memory and then transferred sequentially to the output circuits 320. The output controller 318 is an output control device to control the output priority of the output circuits 320 with regard to the OSD fonts according to control signal from the CPU 306.

Besides receiving color attributes of the OSD fonts, such as red, blue and green, the output circuits 316, output device, employs data conversion so as to transmit the rotated fonts into the display device 322. In other words, the digital signals of the OSD fonts are converted into analog signals and mixed with the attributes of the OSD fonts and delivered to different standard interface cards of the various display devices 322. Additionally, these display devices 322 comprise a CRT display, home TV and LCD.

Figure 4:
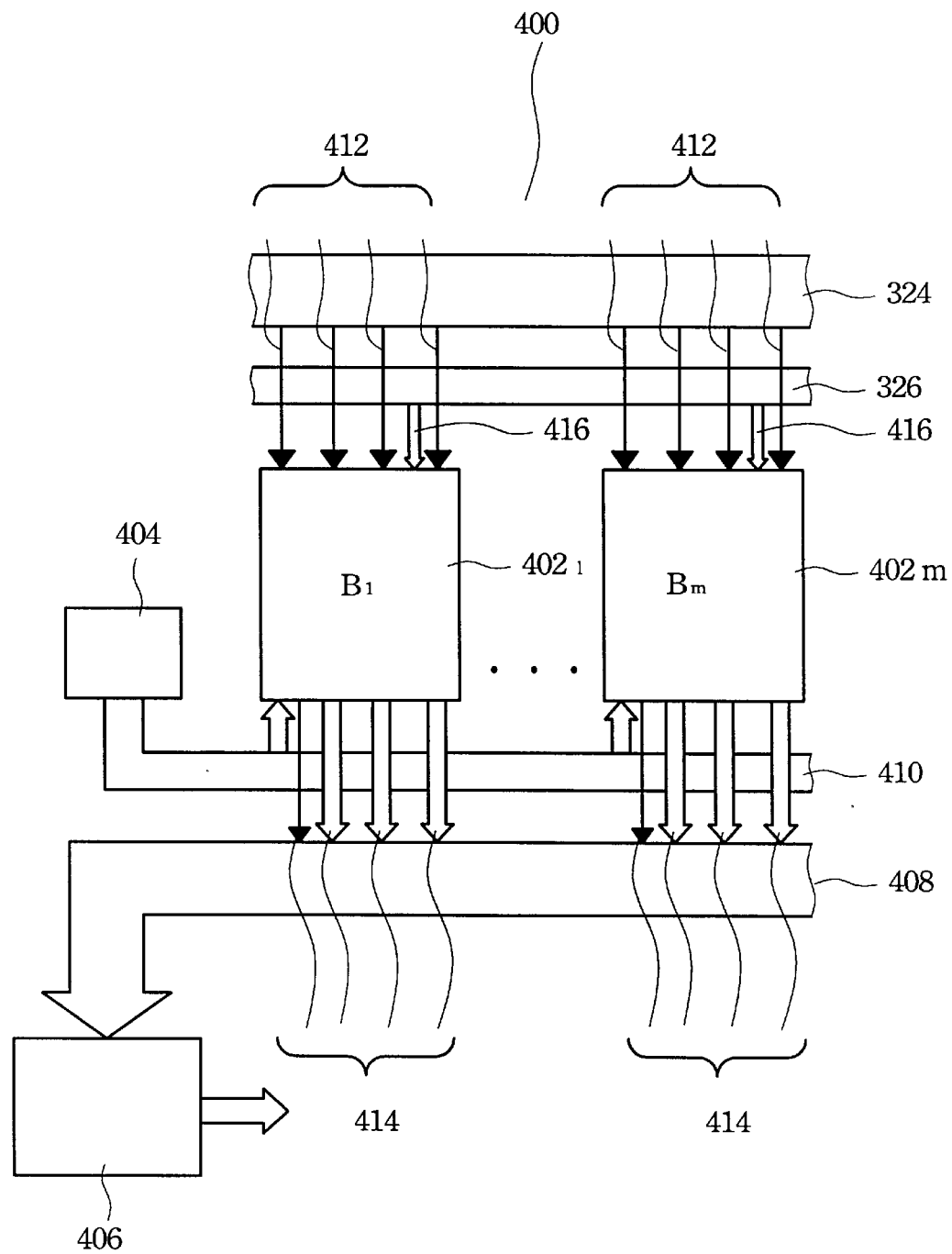
FIG. 4 illustrates a decoder diagram according to the present invention.

Referring to FIG. 4, the figure is a decoder 400 diagram. In the preferred embodiment of the present invention, the decoder 400 comprises a plurality of decoding elements (400₁, . . . , 400ₘ), a scan controller 404 and an output selector 406. Each of these decoding elements, indicated as B₁, 400₁, . . . , Bₘ 400ₘ etc., preferably includes four channels 412 to receive control signals from the control bus 324 of the CPU 306 and these signals are used to control the rotation angles of OSD fonts corresponding to four kinds of angles, 0°, 90° clockwise, 90° counterclockwise and 180° of the display device clockwise or counterclockwise. The decoder also includes z lines of data channel 416, wherein z is the number of the OSD fonts, to receive successively OSD font from data bus 326, such as the OSD fonts in font ROM 312 or the like, and preferably includes 4 output channels 414 connected respectively to each decoder element ($400_l$, ..., $400_m$ etc.). And n lines of channel 410 are connected to the scan controller 404 to control the output of the rotated OSD font after decoding.

The scan controller 404, coupled to the decoding elements and the synchronization generator (not shown) respectively, includes n lines 410, indicated as $L_1, L_2, ..., L_{n-1}, L_n$, of channels to receive the signal from the synchronization signals generator 304 so that the scan sequence of the decoder is controlled completely by the scan controller. In another word, the scan controller can selectively control the dots output of the OSD font referring to the horizontal or vertical synchronization signals. Additionally, the scan selection comprises the various coordinate axis. e.g. horizontal direction (X axis) and vertical direction (Y axis) in the font dot matrix.

The output selector 406, coupled to the decoding elements and the CPU, comprises n selective lines 408, indicated as $D_1, D_2, ..., D_{n-1}, D_n$, connected to the data bus, to receive the output of the decoding elements such that the output priority of the rotated OSD font is correctly controlled. The $D_l$ is LSB and the $D_n$ is MSB respectively.

In the preferred embodiment of the present invention, when the decoder read in a character "P", 12×18 dots, for decoding, the display device 322 is located in 0° position according to the fundamental theorem shown in FIG. 2B. When the 0° position is acknowledged by CPU 306, for example, the sixth row 212, all 12 columns of the OSD font are read simultaneously in the decoding elements so that the sixth row 212 can be decoded through the manipulation of the scan controller 404 and selectively output to the shift register 316. Namely, $L_6$ enable $B_1$, to transmit selectively dot (1, 6) into $D_1$, the rest of the operation of lines are identical, and $L_6$ enables $B_{12}$ to transmit selectively dot (12, 6) into $D_{12}$ so as to form the sixth row 212. Other rows of the character "P" are formed in light of the above likewise. Finally, the character "P" is displayed through the first row to the eighteenth row.

Similarly, for example, the character "P", the left and right sides of the dot matrix are exchanged each other, and the top and bottom sides are fixed normally in the FIG. 2B, which is defined as a first mirror-image position. Therefore, the MSB and LSB of the dot matrix are changed each other, which $D_{12}$ is switched to $D_1$ for MSB and $D_1$ is switched to $D_{12}$ for LSB. And the read-in way of the OSD font is changeless, which the OSD font is successively scanned through $L_1$ to $L_{18}$ according to the first OSD font.

Furthermore, the left and right sides of the dot matrix is fixed normally and the top and bottom sides are turned upside down in the FIG. 2B, which is defined as a second mirror-image position. The MSB and LSB of the dot matrix are changeless each other and the read-in way of the OSD font is exchanged, which the OSD font is successively scanned through $L_{18}$ to $L_1$ according to the first OSD font.

Moreover, the left and right sides of the dot matrix are exchanged each other, and the top and bottom sides are turned upside down in the FIG. 2B, which is defined as a third mirror-image position. The MSB and LSB of the dot matrix are exchanged each other, which $D_{12}$ is switched to $D_1$ for MSB and $D_1$ is switched to $D_{12}$ for LSB. And the read-in way of the OSD font is exchanged, which the OSD font is scanned through $L_{18}$ to $L_1$ according to the first OSD font.

Consequently, each of OSD fonts comprises four position in two dimensions and each position includes four rotation angles so as to form sixteen (4 by 4) kinds of rotation OSD fonts. Such can reduce the duplicated OSD fonts, which are formed by rotating some OSD fonts, such as "b", "d", "p" and "q", etc., to decrease the cost of the memory for storing the OSD fonts.

In the preferred embodiment of the present invention, when the decoder read in a character "P", 12×18 dots, for decoding, the display device is located in clockwise 90° position according to the fundamental theorem shown in FIG. 2C. When the clockwise 90° position is acknowledged by CPU 306, for example, the sixth row 220, all 12 columns of the OSD font are read simultaneously in the decoding elements so that the sixth row 220 can be decoded through the manipulation of the scan controller and selectively output to the shift register 316. Namely, $L_6$ enables $B_6$ to select the dots of the sixth row 220 and to transmit sequentially these dots through $D_1$ to $D_{18}$ so as to form the sixth row 220. In the same way, other rows of the dot matrix are formed in light of the above. Finally, the character "P" is displayed through the first row 216 to the twelfth row. Similarly, the left and right sides of the dot matrix are exchanged each other in the FIG. 2C, which is defined as a mirror-image position. $L_6$ enables $B_6$ to select the dots of the sixth row 220 and to transmit sequentially these dots through $D_{18}$ to $D_1$ so as to form the sixth row 220.

In the preferred embodiment of the present invention, when the decoder read in a character "P", 12×18 dots, for decoding, the display device is located in counterclockwise 90° position according to the fundamental theorem shown in FIG. 2D. When the counterclockwise 90° position is acknowledged by CPU 306, for example, the sixth row 224, all 12 columns of the OSD font are read simultaneously in the decoding elements so that the sixth row 224 can be decoded through the manipulation of the scan controller and selectively output to the shift register 316. In other words, $L_6$ enables $B_6$ to select the dots of the sixth row 224 and to transmit sequentially these dots through $D_{18}$ to $D_1$ so as to form the sixth row 224. In the same way, other rows of the dot matrix are formed in light of the above. Finally, the character "P" is displayed through the first row 222 to the twelfth row. Similarly, the left and right sides of the dot matrix are exchanged each other in the FIG. 2D, which is defined as a mirror-image position. $L_6$ enables $B_6$ to select the dots of the sixth row 224 and to transmit sequentially these dots through $D_1$ to $D_{18}$ so as to form the sixth row 224.

In the preferred embodiment of the present invention, when the decoder read in a character "P", 12×18 dots, for decoding, the display device 322 is located in 180° clockwise or counterclockwise position according to the fundamental theorem shown in FIG. 2E. When the clockwise or counterclockwise 180° position is acknowledged by CPU 306, for example, the sixth row 230, all 12 columns of the OSD font are read simultaneously in the decoding elements so that the sixth row 230 can be decoded through the manipulation of the scan controller and selectively output to the shift register 316. In other words, $L_6$ enable $B_{12}$ to transmit selectively dot (1, 6) into D12, the rest of the operation of lines are identical, and $L_6$ enables $B_1$ to transmit selectively dot (12, 6) into $D_1$ so as to form the sixth row 230. Other rows of the character "P" are formed in light of the above likewise. Finally, the character "P" is displayed through the first row to the eighteenth row 230. Similarly, the left and right sides of the dot matrix are exchanged each other in the FIG. 2E, which is defined as a mirror-image position. $L_6$ enable $B_{12}$ to transmit selectively dot (1, 6) into $D_1$, the rest of the operation of lines are identical, and $L_6$ enables B, to transmit selectively dot (12, 6) into $D_{12}$ so as to form the sixth row 230.

Figure 5:
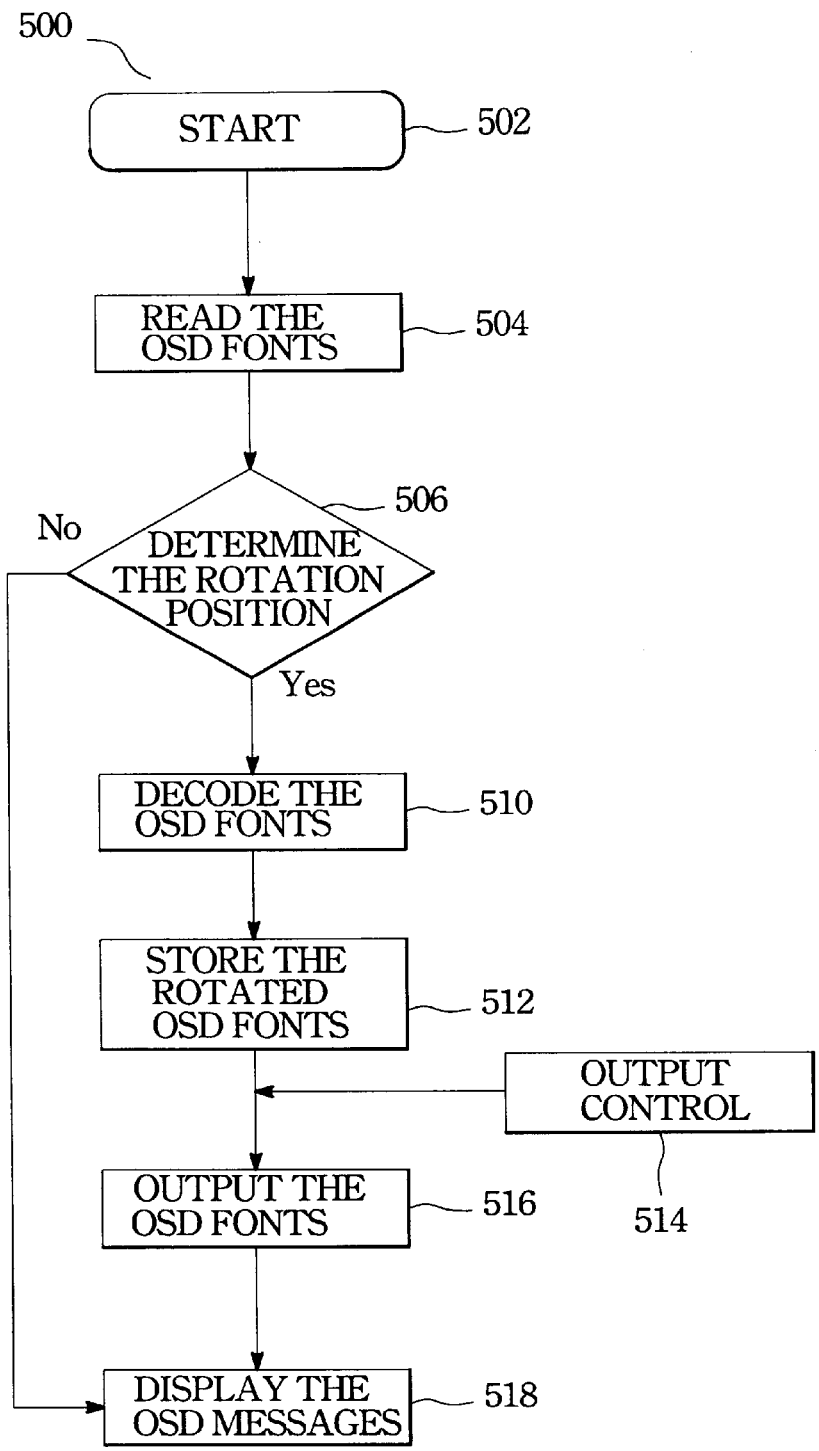
FIG. 5 illustrates a flow chart for showing the rotation of the OSD fonts according to the present invention.

Referring to FIG. 5, the figure is a flow chart 500 for showing the rotation of the OSD fonts. In start step 502, an OSD display demand is input into the CPU 306, such as MCU or DSP, such that the control signals formed by the CPU 306 are transmitted to the variable elements of the OSD rotation device to begin to implement the reading procedure of the OSD fonts.

In step 504 of reading the OSD fonts, the font addresses generator 308 produces the font addresses corresponding to the desired OSD fonts according to the signals from CPU 306. The OSD rotation device uses the signal formed by the synchronization generator 304 as a reference signal wherein the synchronization signals may be consistent with the starting time of the OSD display so as to leave the rotated OSD fonts synchronized with the video display. Next, the OSD font addresses are stored in memory, such as static access memory (SRAM). The desired OSD fonts selected from the OSD font ROM are determined according to the font addresses.

In step 506 of determining the rotation position, after the CPU 306 receives an OSD font rotation demand, the step determines whether the display device 322 is rotated or not. If the query is negatively answered, the step proceed to step 518 where the OSD fonts can be directly input to the display device since the video display is located in the 0° position. If the query at the step 506 is affirmatively answered, the step 506 proceeds to the step 510 where the OSD fonts are decoded by the decoder since the video display may be located in various position, e.g. clockwise 90°, counter-clockwise 9020 and clockwise or counterclockwise 18°.

If the video display is located in the position of clockwise 90°, the theorem is shown in FIG. 2C. For an example of the sixth row 220, all 12 rows of an OSD font are sequentially read in decoding elements from the first row up to twelfth row. The sixth row 220 is scanned via scan controller to perform a decoding process and is output to the shift register 316 by output selector.

If the video display is located in the position of counter-clockwise 90°, the theorem is shown in FIG. 2D. For an example of the sixth row, all 12 rows of an OSD font are sequentially read in decoding elements from the first row up to twelfth row. The sixth row 224 is scanned via scan controller to perform a decoding process and is output to the shift register 316 by output selector.

If the video display is located in the position of clockwise or counterclockwise 180°, the theorem is shown in FIG. 2E. For an example of the sixth row 230, all 12 columns of an OSD font are sequentially read in decoding elements from the first column up to twelfth column. The sixth row 230 is scanned via scan controller 404 to perform a decoding process and is output to the shift register 316 by output selector.

In step 512 of storing the rotated OSD fonts, the rotated OSD fonts decoded by the decoder are converted into serial data type and temporarily stored in the shift register 316 so as to be exported to the output circuits 320 in turn.

In step 516 of outputting the OSD fonts, besides receiving attributes of the OSD font colors, such as red, blue and green, and background colors, the output circuits 320, an output device, employs data conversion to transmit the rotated font into the display device 322. In other word, the digital signals of the OSD fonts is converted into analog signals and mixed with the attributes of the fonts and delivered to different standard interface cards of the various display devices.

In step 514 of output control, the output controller 316 is a device to control the output priority about the OSD fonts according to control signal from the CPU 306.

In step 518 of displaying the OSD message, the display device 322, such as CRT display, TV and LCD, receives the OSD fonts and other related attributes provided with the output circuits and shows thereon.

In summary, an apparatus and method for rotating on-screen display fonts is described in the present invention to remain in the preferred view between the OSD message and the video display. Further, due to the OSD fonts are read in font-based way according the present invention, the operation time of rotating the OSD fonts is much lower than that of the conventional OSD rotated fonts in bit-mapped way. Moreover, the duplicated OSD fonts can be significantly reduced in using the various rotation angles of the OSD fonts.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus for rotating on-screen display (OSD) fonts, comprising:

a central processing unit (CPU), for controlling a rotation of a plurality of OSD fonts by receiving a OSD display demand and generating a control signal from said CPU;

a font addresses generator, coupled with said CPU and a synchronization signal generator respectively, for receiving a reference signal from said synchronization signal generator and said control signal to form a plurality of OSD font addresses;

a memory, coupled with said CPU and said font addresses generator respectively, for storing said OSD font addresses;

a font read only memory (ROM), coupled with said CPU and said memory respectively, for providing said OSD fonts corresponding to said OSD font addresses;

a decoder, coupled with said CPU and said font ROM respectively, for rotating sequentially said OSD fonts to execute rotation of said OSD fonts and form a plurality of rotated fonts;

an output unit, for receiving said rotated fonts, wherein said output unit includes a storage medium, coupled with said decoder and said CPU respectively, for converting the data format of said rotated fonts, an output circuits, connected to said storage medium, for forming a OSD message, and an output controller, coupled with said output circuits and said CPU respectively, for controlling display sequence; and a display device, connected to said output circuits, for displaying said OSD message to form a synchronized display between said video display and said OSD message on said display device.

2. The OSD of claim 1, wherein said decoder further comprises:

a plurality of decoding elements, for receiving said control signal to execute a decoding process;

a scan controller, coupled with each of said decoding elements and said synchronization generator respectively, for controlling the scan sequence during said decoding process; and an output selector, coupled with each of said decoding elements and said CPU, for selecting said output priority of said rotated fonts.

3. The OSD of claim 2, wherein each of said decoding elements comprises a plurality of channels, respectively.

4. The OSD of claim 2, wherein said scan controller comprises a plurality of channels.

5. The OSD of claim 2, wherein said output selector comprises a plurality of channels.

6. The OSD of claim 2, wherein said scan controller comprises one scan selection chose from a group consisting of X axis and Y axis.

7. The OSD of claim 2, wherein said output selector comprises each of said fonts output from MSB to LSB.

8. The OSD of claim 2, wherein said output selector comprises each of said fonts output from LSB to MSB.

9. The OSD of claim 1, wherein said synchronized display further comprises one position selected from a group consisting of:

a first OSD font position, as said display device is located in 0° position, for forming said synchronized display between said video display and said OSD message for a proper view;

a second OSD font position, said display device is located in clockwise 90° position, for forming said synchronized display between said video display and said OSD message for a proper view;

a third OSD font position, said display device is located in counterclockwise 90° position, for forming said synchronized display between said video display and said OSD message for a proper view; and a fourth OSD font position, said display device is located in clockwise 180° position, for forming said synchronized display between said video display and said OSD message for a proper view.

10. The OSD of claim 9, wherein each of said OSD font position comprises respectively one selected from a group consisting of a first mirror-image position, a second mirror-image position and a third mirror-image position.

11. The OSD of claim 1, wherein said font ROM used to store said OSD fonts employs a font-based as storage unit.

12. The OSD of claim 1, wherein said font ROM from which said OSD fonts are read employs a font-based as reading unit.

13. The OSD of claim 1, wherein said display device comprises one selected from a group consisting of cathode ray tube (CRT) display and liquid crystal display (LCD).

14. A method for rotating on-screen display (OSD) fonts, comprising the steps of:

inputting a OSD display demand into a CPU for commanding said CPU to start reading in a plurality of OSD font addresses;

producing a plurality of OSD fonts corresponding to said OSD font addresses stored in a memory;

reading said OSD fonts corresponding to said font addresses and delivering said OSD fonts to a decoder, wherein said OSD fonts are stored initially in a font read only memory (ROM); and performing a decoding process for said OSD fonts to form a plurality of rotated fonts;

storing said rotated fonts into a storage medium;

outputting sequentially said rotated fonts located in said storage medium into a output circuits; and displaying a OSD message including said rotated fonts on a display device so that the video display and said OSD message form a synchronized display.

15. The OSD of claim 14, wherein said decoding process further comprises:

executing a decoding process by using a plurality of decoding elements according a control signal;

controlling a scan sequence by using a scan controller receiving a synchronized signal from a synchronization generator during decoding process; and selecting the output priority of said rotated fonts by using a output selector.

16. The OSD of claim 15, wherein each of said decoding elements for executing said decoding process comprises a plurality of channels.

17. The OSD of claim 15, wherein said scan controller for controlling said scan sequence comprises a plurality of channels.

18. The OSD of claim 15, wherein said output selector for selecting said output priority of said rotated fonts comprises a plurality of channels.

19. The OSD of claim 15, wherein said scan controller comprises one scan selection chose from a group consisting of X axis and Y axis.

20. The OSD of claim 15, wherein said output selector comprises each of said font output from MSB to LSB.

21. The OSD of claim 15, wherein said output selector comprises each of said font output from LSB to MSB.

22. The OSD of claim 14, wherein said synchronized display further comprises one position selected from a group consisting of:

a first OSD font position, as said display device is located in 0° position, for forming said synchronized display between said video display and said OSD message for a proper view;

a second OSD font position, said display device is located in clockwise 90° position, for forming said synchronized display between said video display and said OSD message for a proper view;

a third OSD font position, said display device is located in counterclockwise 90° position, for forming said synchronized display between said video display and said OSD message for a proper view; and a fourth OSD font position, said display device is located in clockwise 180° position, for forming said synchronized display between said video display and said OSD message for a proper view.

23. The OSD of claim 22, wherein each of said OSD font position comprises respectively one selected from a group consisting of a first mirror-image position, a second mirror-image position and a third mirror-image position.

24. The OSD of claim 14, wherein said step of reading OSD fonts is the use of a font-based as read unit.

25. The OSD of claim 14, wherein said step of storing font addresses is the usage of a font-based as storage unit.

26. The OSD of claim 14, wherein said step of display OSD message is the usage of a display device selected from a group consisting of a CRT display and a LCD.

* * * * *